US012518679B2

(12) United States Patent
Chiu et al.

(10) Patent No.: US 12,518,679 B2
(45) Date of Patent: Jan. 6, 2026

(54) SCAN CIRCUIT APPLICABLE TO DRIVING A PLURALITY OF LIGHT-EMITTING-DIODES (LED) OF A DISPLAY PANEL

(71) Applicant: NOVATEK MICROELECTRONICS CORP., Hsinchu (TW)

(72) Inventors: Min-Yang Chiu, Taichung (TW); Yu-Sheng Ma, Taichung (TW); Jin-Yi Lin, Kaohsiung (TW); Hsuan-Yu Chen, Hsinchu (TW); Jhih-Siou Cheng, New Taipei (TW); Chun-Fu Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/656,889

(22) Filed: May 7, 2024

(65) Prior Publication Data

US 2025/0349241 A1 Nov. 13, 2025

(51) Int. Cl.
*G09G 3/32* (2016.01)

(52) U.S. Cl.
CPC ....... *G09G 3/32* (2013.01); *G09G 2310/0267* (2013.01); *G09G 2320/0257* (2013.01)

(58) Field of Classification Search
None
See application file for complete search history.

(56) References Cited

U.S. PATENT DOCUMENTS

2024/0046856 A1 * 2/2024 Ma .......................... G09G 3/32

* cited by examiner

*Primary Examiner* — Ifedayo B Iluyomade
(74) *Attorney, Agent, or Firm* — Rosenberg, Klein & Lee

(57) ABSTRACT

A scan circuit applicable to driving a plurality of light-emitting-diodes of a display panel is provided. Each of a plurality of switching components is electrically connected with a scan line of the display panel for determining if the light-emitting-diodes connected to the scan line are conductive. A plurality of power transistors are disposed corresponding to the scan lines, each connected between one scan line and a ground terminal. A low-dropout regulator circuit or global operational amplifier is alternatively connected to the plurality of switching components in common for selectively pulling up a voltage level of the scan lines and avoiding ghost imaging on the display panel. By employing the proposed scan circuit, the invention is effective in achieving de-ghost functioning and avoiding conventional signal coupling issues on the display panel. In addition, redundant power waste consumption is significantly reduced at the same time.

20 Claims, 10 Drawing Sheets

SCAN CIRCUIT APPLICABLE TO DRIVING A PLURALITY OF LIGHT-EMITTING-DIODES (LED) OF A DISPLAY PANEL

BACKGROUND OF THE INVENTION

Field of the Invention

The present invention is related to a de-ghosting technology. More particularly, the present invention is aimed to provide a novel scan circuit where a low-dropout regulator circuit or a global operational amplifier is disposed therein, so as to eliminate the conventional ghosting imaging occurring in the light-emitting diode display panel.

Description of the Prior Art

As known, in recent years, a light-emitting-diode (LED) display is a flat panel display that uses an array of light-emitting diodes as pixels for a video display. And currently, since the LED displays are capable of providing the general illumination in addition to visual display, the vivid variety of brightness allows them to be commonly used for a lot of purposes. As the LED displays are able to offer higher contrast ratios than a projector and are thus becoming an adequate alternative to traditional projection screens, the LED displays have also become commonly used everywhere.

When regarding a detailed configuration of the LED display panel devices, it is known that the LED display panel device mostly includes a plurality of source driver integrated circuits (ICs) for supplying a data voltage to data lines of the LED display panel device, a plurality of gate driver ICs for sequentially supplying a gate pulse (or a scan pulse) to gate lines of the LED display panel device, and a timing controller for controlling the above-mentioned source driver ICs and the gate driver ICs, etc. Currently, since the resolution and pixel density of a matrix LED display panel is getting higher and more intense, it is inevitable that the LED display panel has been required to meet numerous challenges that affect the display performances, since the display performance is always a critical criterion. Especially regarding a narrow pixel pitch matrix LED display panel, common issues including: ghosting, non-uniformity in low gray scale, coupling between various shown brightness, caterpillar caused by open LED or short LED, and first scan line dim and so on, significantly influence the display performances of a matrix LED display panel. Among them, ghosting is a common issue which has been observed in a typical matrix LED display panel. As known, a ghosting effect is indicated as a certain group of LEDs disposed in the LED display panel which are lighted up when they do not need to be lighted. And the ghosting effect is even more pronounced using a left or a right slash grid test pattern. Generally, it can be mostly observed that there are two types of ghosting which can be found in a matrix LED display panel, including an upside ghosting and a downside ghosting. For instance, regarding a typical matrix LED display panel, a plurality of scan lines disposed on the LED display panel are sequentially driven, and the main cause of an upside ghosting is coming from the built-up charge in the parasitic capacitance when transitioning between various scan lines. The parasitic capacitance is charged through the LED causing it to light up when it does not need to be lighted, thereby the upside ghosting is generated. And such ghosting effect has been becoming particularly severe as the pixel pitch of a matrix LED display panel is getting narrower.

Please refer to FIG. 1, which shows a schematic diagram of a conventional matrix LED display panel architecture where the upside ghosting is generated. FIG. 2 shows a relative diagram illustrating the actual imaging of the upside ghosting as referring to FIG. 1. According to FIG. 2, the upside ghosting shown as a left slash grid illuminating pattern can be observed as indicated in the area P22. As we can see form FIG. 1, a plurality of scan lines are provided to be sequentially turned on, for instance Scan1 and Scan2. Channel lines including IOUT1 and IOUT2 are disposed as constant current channels so as to drive a LED display panel. A light-emitting-diode LED1 is electrically coupled between the scan line Scan1 and the channel line IOUT1. The light-emitting-diode LED2 is electrically coupled between the scan line Scan1 and the channel line IOUT2. The light-emitting-diode LED3 is electrically coupled between the scan line Scan2 and the channel line IOUT1. And the light-emitting-diode LED4 is electrically coupled between the scan line Scan2 and the channel line IOUT2. Since the scan line Scan2 is successively turned on following the scan line Scan1, a voltage level of the scan line Scan1, where a cathode of the light-emitting-diode LED1 is electrically connected thereto, after the scan line Scan2 is turned on, will be pulled down to a low voltage level or floating. And thus, a current path L11 is generated, conducting the light-emitting-diode LED1 such that the light-emitting-diode LED1 is lighted up. Such unexpected lighting up results in the upside ghosting imaging. In order to eliminate the ghosting imaging generated in a LED display panel, several methods have been discussed these days in the current technology and yet, challenges are still remained. Further improvements and alternative methodologies in the field are still to be expected.

As a result, it, in view of all, should be apparent and obvious that there is indeed an urgent need for the professionals in the field for a novel and inventive scan circuit adapted to drive a LED display panel to be developed, so as to avoid the above-mentioned ghosting issues in a way and solving the signal coupling deficiency at the same time.

SUMMARY OF THE INVENTION

In order to overcome the above-mentioned disadvantages, one major objective in accordance with the present invention is to provide a novel scan circuit which is applicable to driving a plurality of light-emitting-diodes (LED) of a display panel. When the proposed scan circuit is adopted to drive the plurality of light-emitting-diodes (LED) of a display panel, it is believed that optimization of de-ghosting efficiency as well as minimum signal coupling can be accomplished. Therefore, unexpected ghosting imaging generated on the light-emitting-diode display panel is effectively avoided, and at the same time, since the light-emitting-diodes in the panel that should not be lighted up are suppressed, redundant power waste can be also significantly eliminated by employing the technical solution disclosed by the present invention.

As such, in view of a first embodiment of the present invention, a scan circuit applicable to driving a plurality of light-emitting-diodes (LED) of a display panel is provided. The proposed scan circuit includes: a plurality of switching components, a plurality of power transistors and a low-dropout regulator circuit. Each of the plurality of switching components is electrically connected with a scan line of the display panel for determining if the plurality of LEDs connected to the scan line are conductive. The plurality of power transistors are disposed corresponding to the plurality of scan lines of the display panel, wherein each power transistor is electrically connected between each of the scan lines and a ground terminal. The low-dropout regulator circuit is electrically connected to the plurality of switching components in common, such that a common joint is formed between the low-dropout regulator circuit and the plurality of switching components, and the low-dropout regulator circuit is able to selectively pull up a voltage level of at least one of the scan lines so as to avoid ghosting imaging on the display panel.

In another aspect, the present invention also proposes a second embodiment for implementing the disclosed scan circuit. According to the second embodiment of the present invention, another scan circuit which is applicable to driving a plurality of light-emitting-diodes (LED) of a display panel is provided as well. And the proposed scan circuit of the second embodiment includes: a plurality of switching components, a plurality of power transistors and a global operational amplifier. The global operational amplifier is also configured as being electrically connected to the plurality of switching components in common, such that a common joint is formed between the global operational amplifier and the plurality of switching components. As a result, the proposed global operational amplifier is able to selectively pull up a voltage level of at least one of the scan lines so as to avoid ghosting imaging on the display panel.

According to the second embodiment of the present invention, the disclosed global operational amplifier is preferably a negative feedback amplifier, having its negative terminal and output terminal connected in common. And the output terminal of the global operational amplifier is then coupled to the common joint where the global operational amplifier and the plurality of switching components are connected so as to pull up a voltage level of at least one of the scan lines for the purpose of avoiding ghosting imaging on the display panel.

As a result, when adopting the proposed technical contents of the present invention, it is believed that by employing the proposed scan circuit in the invention, the ghosting imaging issues compared to the prior arts are thus, greatly much reduced. In addition, the prior severe signal coupling issues are believed to be eliminated in the present invention. Thereby, it is believed that the present invention achieves to successfully solves the problems of prior arts and performs as being highly competitive and able to be widely utilized in any related industries.

Various and many alternatives as well as modifications will be apparent to those skilled in the art, once informed by the present disclosure. And yet, the present invention is certainly not limited thereto. It is believed that the present disclosure claims and covers the alternatives and modifications with equality.

These and other objectives of the present invention will become obvious to those of ordinary skill in the art after reading the following detailed description of preferred embodiments. And it is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
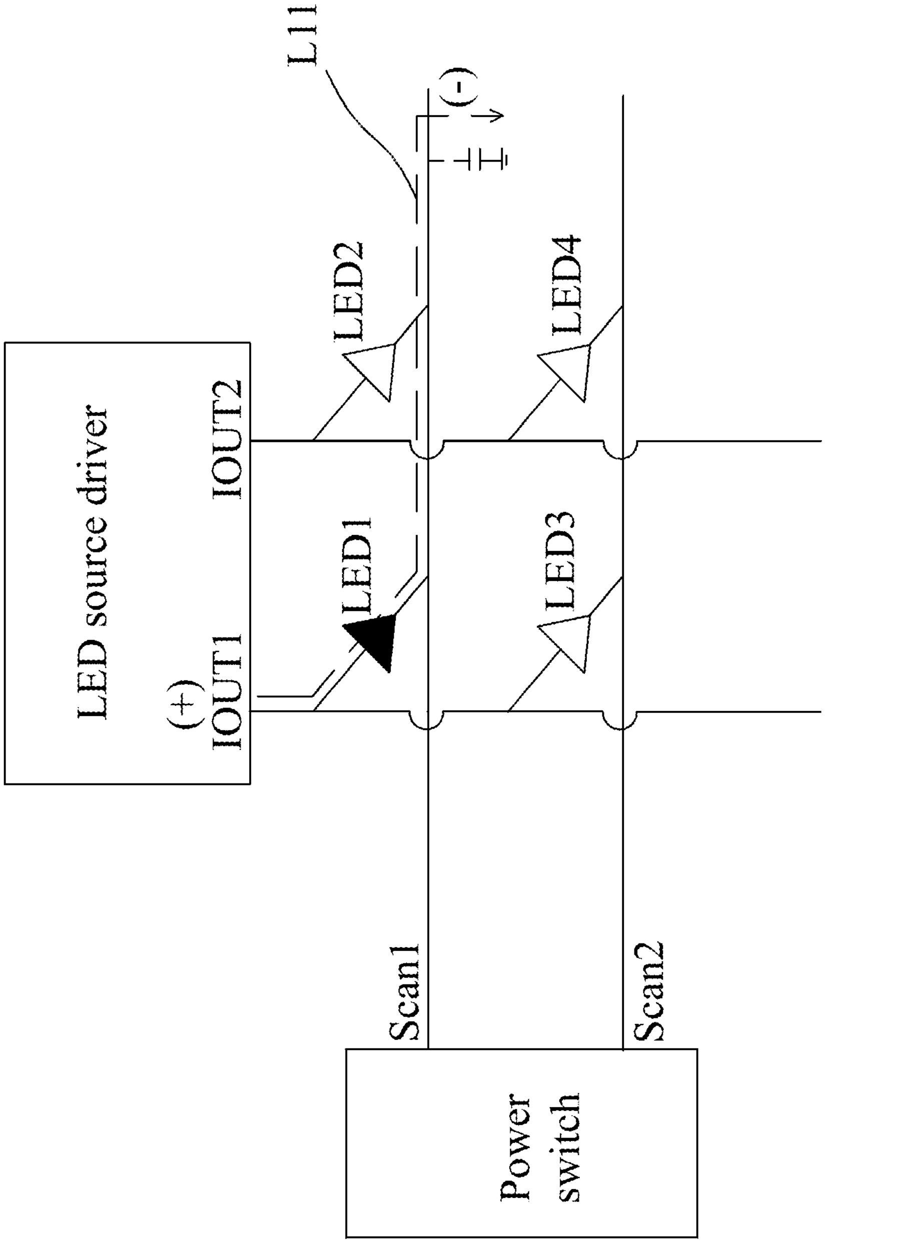
Fig. 1 (prior art)
FIG. 1 shows a schematic diagram of a conventional matrix light-emitting-diode display panel architecture where the upside ghosting is generated.
Figure 2:
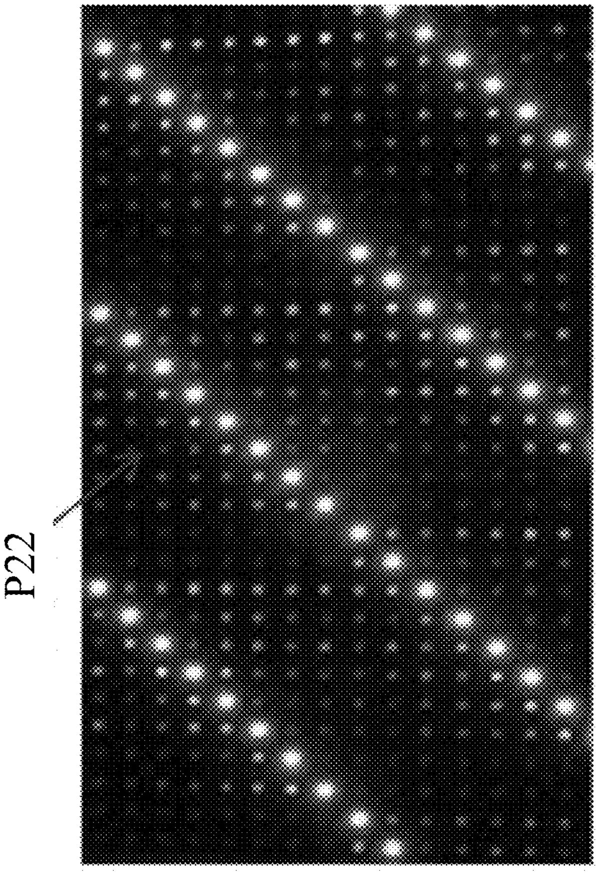
Fig. 2 (prior art)
FIG. 2 shows a relative diagram illustrating the actual imaging of the upside ghosting as referring to FIG. 1.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, a scan circuit which is applicable to driving a light-emitting-diode (LED) display panel will be provided. The provided scan circuit is proposed so as to achieve for de-ghost efficiency. In other words, by employing the proposed scan circuit for driving a light-emitting-diode (LED) display panel, it is believed that the conventional ghosting imaging and deficiencies occurred on the light-emitting-diode display panel may be significantly suppressed and avoided.

Figure 3:
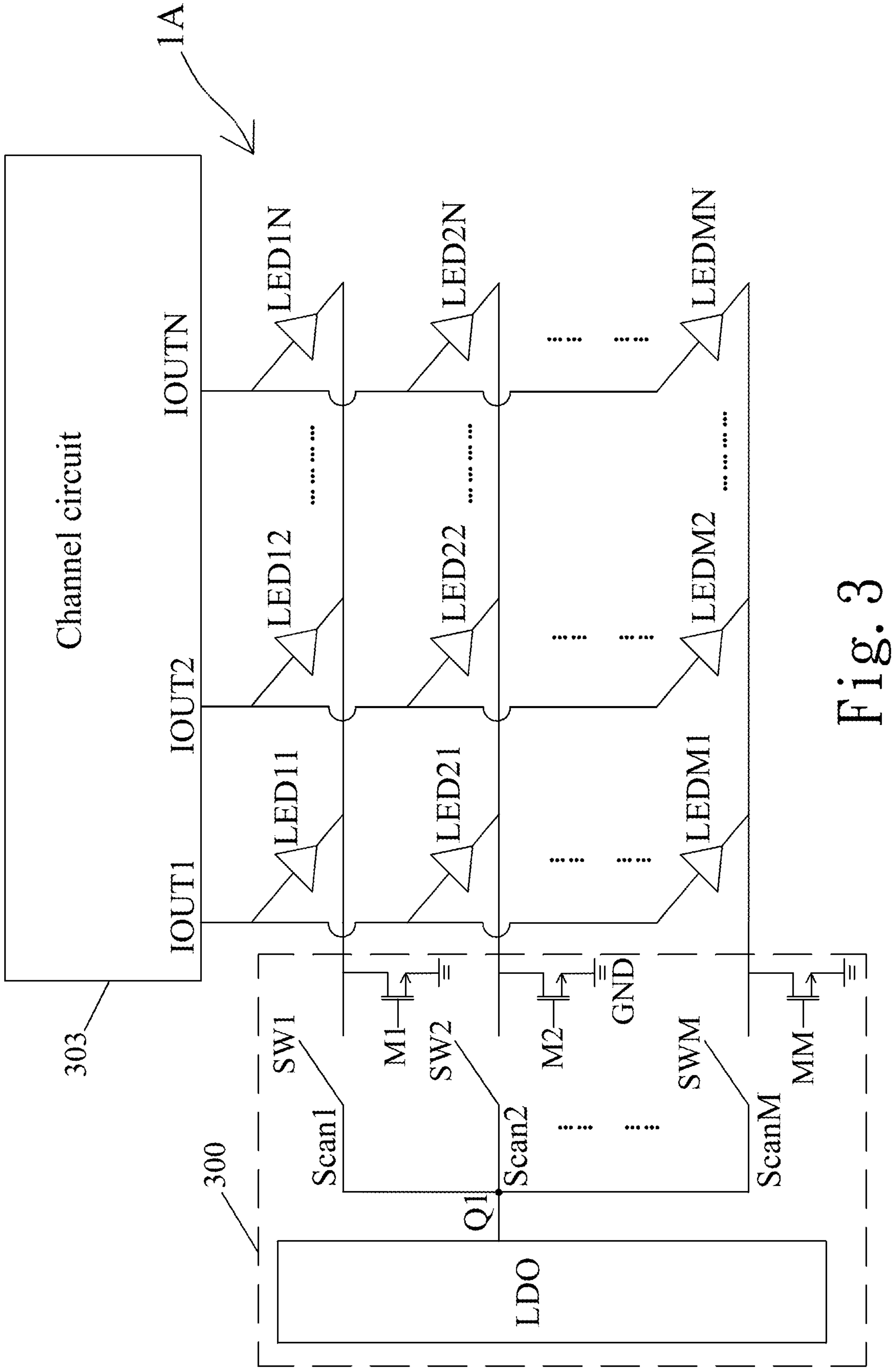
FIG. 3 shows a diagram schematically illustrating a scan circuit applicable to driving a plurality of light-emitting-diodes (LED) of a display panel in accordance with a first embodiment of the present invention.

At first, please refer to FIG. 3, which shows a diagram schematically illustrating a scan circuit applicable to driving a plurality of light-emitting-diodes (LED) of a display panel in accordance with a first embodiment of the present invention. As referring to FIG. 3, a scan circuit 300 is provided in order to drive a light-emitting-diode display panel 1A. In the light-emitting-diode display panel 1A, a plurality of light-emitting-diodes LED11, LED12, LED1N, LED21, LED22, . . . LED2N, LEDM1, LEDM2, . . . LEDMN are configured for emitting lights and functioning as illuminating. A channel circuit 303 is configured and providing a plurality of channel lines. As can be seen in the embodiment of FIG. 3, the light-emitting-diode display panel 1A is illustrated as including a number of N channel lines, where N is a positive integer, and each of the channel lines is illustrated as "IOUT1, IOUT2, . . . IOUTN". In the meantime, the scan circuit 300 is configured and providing a plurality of scan lines. As can be seen in the embodiment of FIG. 3, the light-emitting-diode display panel 1A is illustrated as including a number of M scan lines, where M is a positive integer and each of the scan lines is illustrated as "Scan1, Scan2, . . . ScanM".

Each of the plurality of the scan lines Scan1, Scan2, . . . ScanM is electrically connected with the plurality of channel lines IOUT1, IOUT2, . . . IOUTN, and each of the plurality of channel lines IOUT1, IOUT2, . . . IOUTN is disposed in a column perpendicular to the scan lines Scan1, Scan2, . . . ScanM.

According to the embodiment as illustrated in FIG. 3, each of the light-emitting-diodes LED11, LED12, . . . LED1N, LED21, LED22, . . . LED2N, LEDM1, LEDM2, . . . LEDMN includes an anode and a cathode, where the anode of a LED is coupled with one channel line and the cathode of the LED is coupled with one scan line. For instance, the anode of the light-emitting-diode LED11 is coupled with the channel line IOUT1 and the cathode of the light-emitting-diode LED11 is coupled with the scan line Scan1. The anode of the light-emitting-diode LED1N is coupled with the channel line IOUTN and the cathode of the light-emitting-diode LED1N is coupled with the scan line Scan1. By applying the similar configuration manners, it is believed that the anode of the light-emitting-diode LEDMN is coupled with the channel line IOUTN and the cathode of the light-emitting-diode LEDMN is coupled with the scan line ScanM. Regarding the rest of light-emitting-diodes disposed in the light-emitting-diode display panel 1A, repeated descriptions are omitted hereinafter in the Application. Alternatively, the disclosed configuration regarding the light-emitting-diode display panel, as provided hereinafter may also be applied depending on various circuit configurations. The present invention is not limited thereto.

As can be seen in the first embodiment of the present invention in FIG. 3, the scan circuit 300 is proposed so as to comprise a plurality of switching components SW1, SW2 . . . SWM, a plurality of power transistors M1, M2 . . . MM, as well as a low-dropout regulator circuit LDO. Regarding the switching components SW1, SW2 . . . SWM, it is illustrated that each of the switching components SW1, SW2 . . . SWM is electrically connected with one scan line Scan1, Scan2, . . . ScanM of the LED display panel 1A, so as to control and determine if the plurality of LEDs connected to the scan line Scan1, Scan2, . . . ScanM are conductive. For instance, the switching component SW1 is electrically connected with the scan line Scan1. And when the switching component SW1 is open, the plurality of LEDs connected to the scan line Scan1 are conductive. By applying the same manners, each of the rest switching components SW2 . . . SWM can be made in either of an open state or a closed state, so as to decide and control if those LEDs connected to scan line Scan2, . . . ScanM can be conductive.

The plurality of power transistors M1, M2 . . . MM are disposed corresponding to the plurality of scan lines Scan1, Scan2, . . . ScanM, and each power transistors M1, M2 . . . MM is electrically connected between one scan line Scan1, Scan2, . . . ScanM and a ground terminal GND. For instance, the power transistor M1 is electrically connected between the scan line Scan1 and the ground terminal GND. The power transistor M2 is electrically connected between the scan line Scan2 and the ground terminal GND. And the power transistor MM is electrically connected between the scan line ScanM and the ground terminal GND.

According to the first embodiment of the present invention, please refer to FIG. 3, it can be seen that the plurality of switching components SW1, SW2 . . . SWM are commonly connected with the low-dropout regulator circuit LDO, such that a common joint Q1 is formed between the low-dropout regulator circuit LDO and the plurality of switching components SW1, SW2 . . . SWM. According to the technical spirits of the present invention, the low-dropout regulator circuit LDO is implemented as outputting a high voltage level, in order to selectively pulling up a voltage level of at least one of the scan lines Scan1, Scan2, . . . ScanM so as to avoid ghosting imaging generated on the light-emitting-diode display panel 1A.

Figure 4:
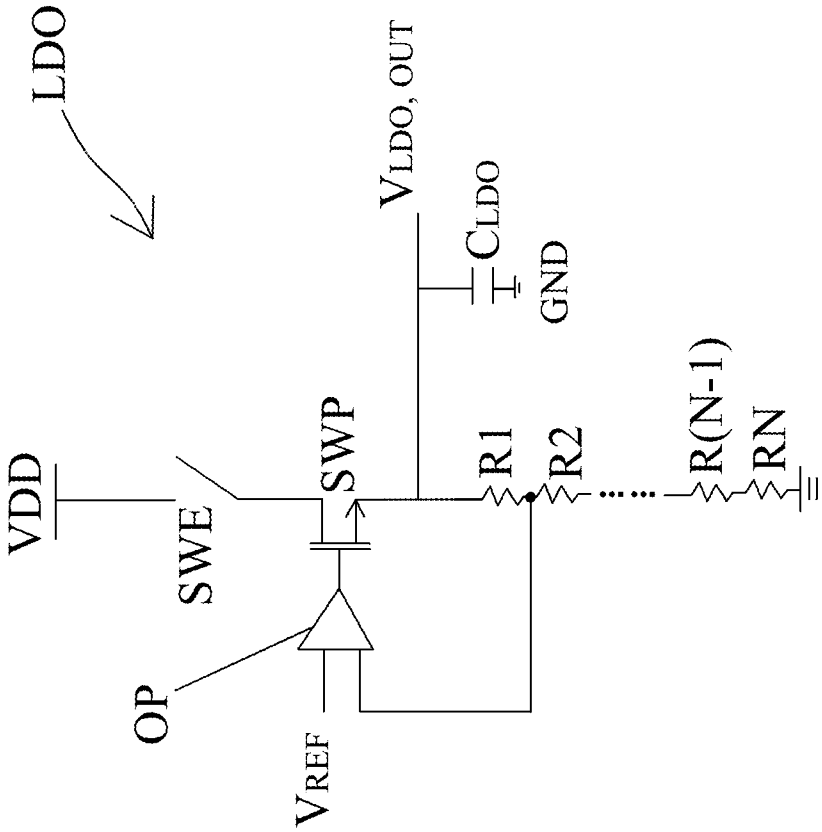
FIG. 4 schematically shows the circuit implementation of the proposed low-dropout regulator circuit LDO in accordance with the first embodiment of the present invention in FIG. 3.

Please refer to FIG. 4 for a detailed circuit diagram, which schematically shows the circuit implementation of the proposed low-dropout regulator circuit LDO in accordance with the first embodiment of the present invention in FIG. 3. As can be seen, the low-dropout regulator circuit LDO is proposed, comprising an operational amplifier OP, a power switch SWP, an enable switch SWE, a plurality of resistors R1, R2 . . . R(N-1), RN which are connected in series as well as a low-dropout capacitance $C_{LDO}$.

Figure 5:
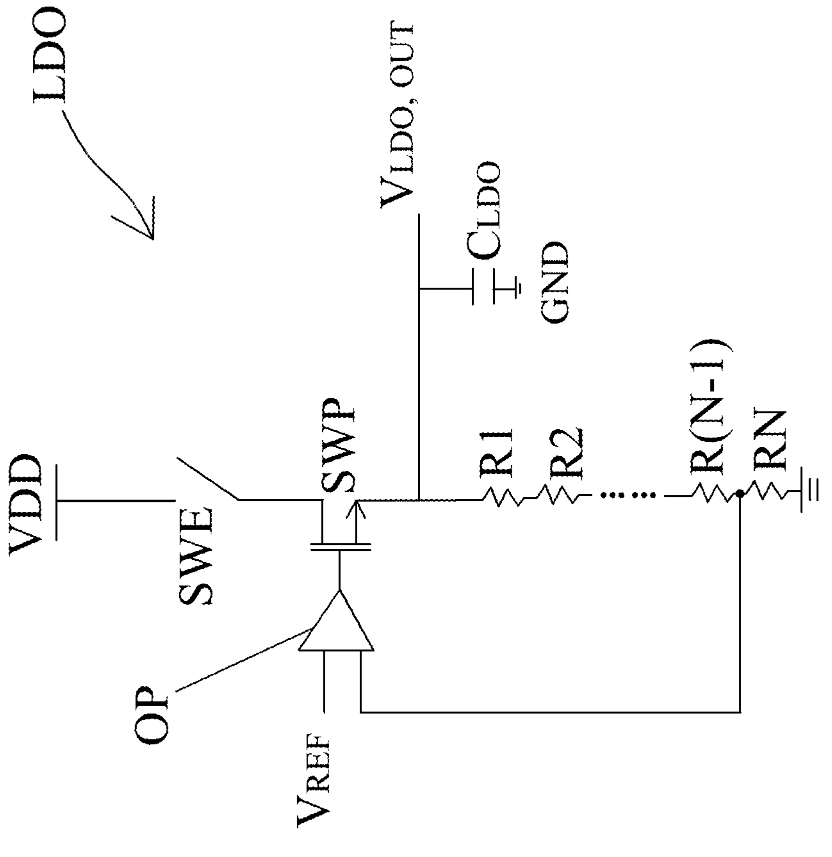
FIG. 5 schematically shows another feasible circuit implementation of the proposed low-dropout regulator circuit LDO in accordance with the first embodiment of the present invention in FIG. 3.

According to the disclosed implementation of the low-dropout regulator circuit LDO, a positive terminal (+) of the operational amplifier OP is adapted to receive a reference voltage $V_{REF}$, and a negative terminal (−) of the operational amplifier OP is selectively coupled with a joint node of the plurality of resistors R1, R2 . . . R(N-1), RN connected in series. In the embodiment of FIG. 4, it is illustrative that the negative terminal (−) of the operational amplifier OP is coupled to a joint node between the resistors R1 and R2. However, the present invention is not limited thereto such an embodiment. Please refer to FIG. 5 for showing another feasible implementation of the proposed low-dropout regulator circuit LDO. As can be seen in FIG. 5, the negative terminal (−) of the operational amplifier OP may be alternatively connected to a joint node between the resistors R(N-1) and RN. In general, by varying where the negative terminal (−) of the operational amplifier OP is connected with the joint node of the resistors R1, R2 . . . R(N-1), RN, an output voltage $V_{LDO,\ OUT}$ can be adjusted. For instance, as the joint node which the negative terminal (−) of the operational amplifier OP is connected with is getting closer to the resistor RN, it is believed that a higher voltage value of the output voltage $V_{LDO,\ OUT}$ can be obtained. According to the two various embodiments as illustrated in FIG. 4 and FIG. 5, then it can be retrieved that the output voltage $V_{LDO,\ OUT}$ generated in FIG. 5, can be made higher than the output voltage $V_{LDO,\ OUT}$ generated in FIG. 4. As a result, according to the technical characteristics of the present invention, the output voltage $V_{LDO,\ OUT}$ of the proposed low-dropout regulator circuit LDO is adjustable.

In addition, an output terminal of the operational amplifier OP is connected with a gate terminal of the power switch SWP. And a drain terminal of the power switch SWP is coupled with a power supplied voltage VDD through the enable switch SWE. Moreover, the source terminal of the power switch SWP is connected to the ground terminal GND through the low-dropout capacitance $C_{LDO}$. In addition, the source terminal of the power switch SWP is also electrically connected with the plurality of resistors R1, R2 . . . R(N-1), RN which are connected in series, and outputting the above-mentioned output voltage $V_{LDO}$, OUT. According to the first embodiment of the present invention, the output voltage $V_{LDO,\ OUT}$ is a positive voltage, and the positive voltage $V_{LDO,\ OUT}$ output by the low-dropout regulator circuit LDO can be made, for example, in a range between 1V and 2V, in relative to the reference voltage $V_{REF}$ as being 0.5V.

Please refer to FIG. 3 at the same time. It is believed that the positive voltage $V_{LDO,\ OUT}$ is then coupled to the common joint Q1 where the low-dropout regulator circuit LDO and the plurality of switching components SW1, SW2 . . . SWM are commonly connected, such that by generating and outputting the positive voltage $V_{LDO}$, OUT, the low-dropout regulator circuit LDO is able to output the positive voltage $V_{LDO,\ OUT}$ for selectively pulling up a voltage level of at least one of the scan lines Scan1, Scan2, . . . ScanM so as to avoid ghosting imaging generated on the light-emitting-diode display panel 1A.

For detailed operations of driving a light-emitting-diode display panel, it is known that in order to drive the light-emitting-diode display panel 1A, the plurality of the scan lines Scan1, Scan2, . . . ScanM will be sequentially activated as each of the plurality of power transistors M1, M2 . . . MM connected thereto the corresponding scan line, is sequentially turned on. For example, the first power transistor M1 will be turned on first so as to activate the first scan line Scan1. After that, the first power transistor M1 is turned off, and instead, the second power transistor M2 will be turned on successively so as to activate the second scan line Scan2. By applying the same manner, the final power transistor MM will be turned on at last, so as to activate the final scan line ScanM. As a result, according to the technical contents of the present invention, please refer to FIG. 6, when a first row of the plurality of the scan lines is activated, which is the first scan line Scan1, then the first switching component SW1 connected with the first scan line Scan1 is open, while the plurality of switching components except the first switching component SW1 will be closed. In this case, the first switching component SW1 is open, and the rest switching components SW2 . . . SWM are closed, so as to pull up the voltage level of the scan lines except the first row. That is to say, the voltage level of the scan lines Scan2 . . . ScanM will be pulled up and raised. And under such a circumstance, it is believed that the cathode of the light-emitting-diodes LED21, LED22, LED2N, . . . LEDM1, LEDM2, . . . LEDMN will be raised to be at a high voltage level. And as a result, as the cathode voltage of the light-emitting-diodes LED21, LED22, . . . LED2N, . . . LEDM1, LEDM2, . . . LEDMN are raised and pulled up to a high voltage level, it is obvious that there will be no current path to be formed from the anode to the cathode of the light-emitting-diodes LED21, LED22, . . . LED2N, . . . LEDM1, LEDM2, . . . LEDMN, thereby suppressing and avoiding the ghosting imaging on the light-emitting-diode display panel 1A.

Figure 6:
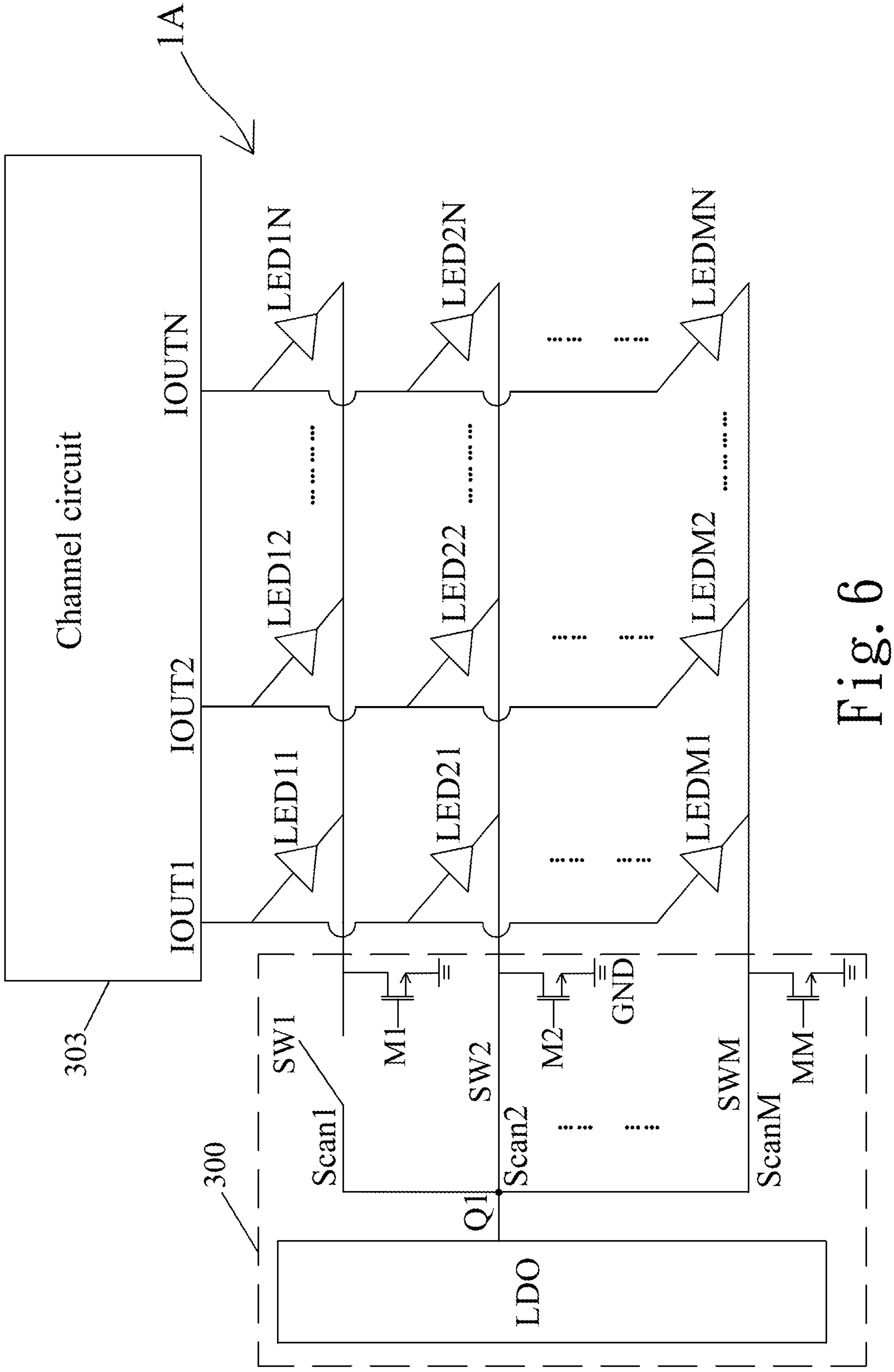
FIG. 6 schematically shows a diagram illustrating the operating state according to FIG. 3 when the first switching component SW1 is open, and the rest switching components SW2 . . . SWM are closed.
Figure 7:
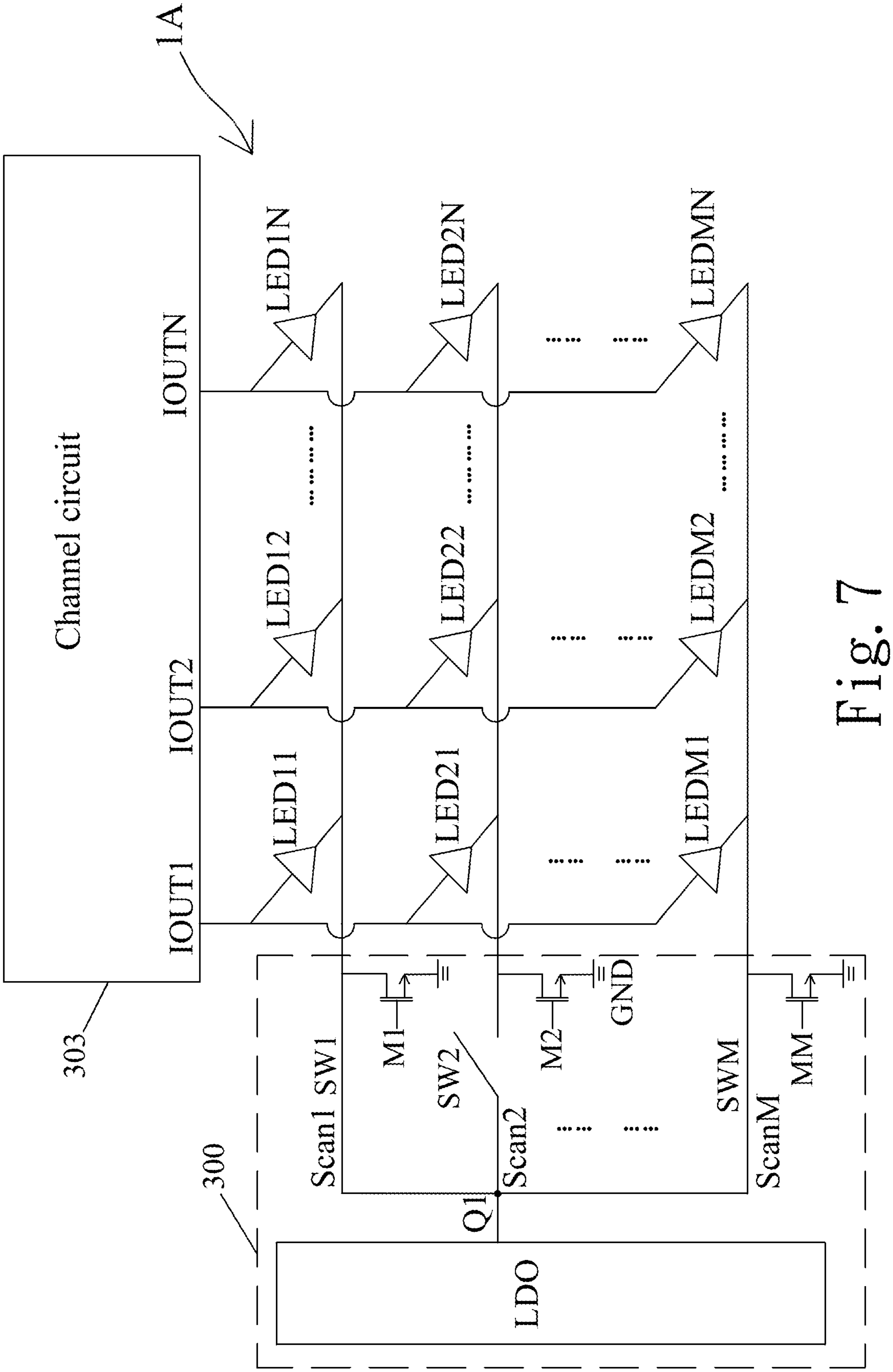
FIG. 7 schematically shows a diagram illustrating the operating state after the previously described FIG. 6 when the second switching component SW2 is open, and the rest switching components except the second switching component SW2, are closed.

And after that, please refer to FIG. 7, which schematically shows a diagram illustrating the operating state after the previously described FIG. 6. According to FIG. 7, it can be seen that after the first scan line Scan1 is activated, the second row of the scan lines, that is the second scan line Scan2, will be activated following the first row Scan1, and the first row Scan1 is disabled. At this time, the second switching component SW2 connected with the second row Scan2 will be open, and the plurality of switching components except the second switching component SW2 are closed so as to pull up the voltage level of the plurality of the scan lines except the second scan line Scan2. In this case, the second switching component SW2 is open, and the rest switching components SW1 . . . SWM (except the second switching component SW2) are closed, so as to pull up the voltage level of the scan lines except the second row. That is, the voltage level of the scan lines Scan1 . . . ScanM except the second scan line Scan2, will be pulled up and raised. As a result, the cathode of the light-emitting-diodes LED11, LED12, . . . LED1N, . . . LEDM1, LEDM2, . . . LEDMN (expect LED21, LED22 . . . LED2N) will be at a high voltage level, such that no current path can be formed from the anode to the cathode of the light-emitting-diodes LED11, LED12, LED1N, . . . LEDM1, LEDM2, . . . LEDMN (expect LED21, LED22 . . . LED2N), thereby suppressing and avoiding the unexpected ghosting imaging on the light-emitting-diode display panel 1A.

Figure 8:
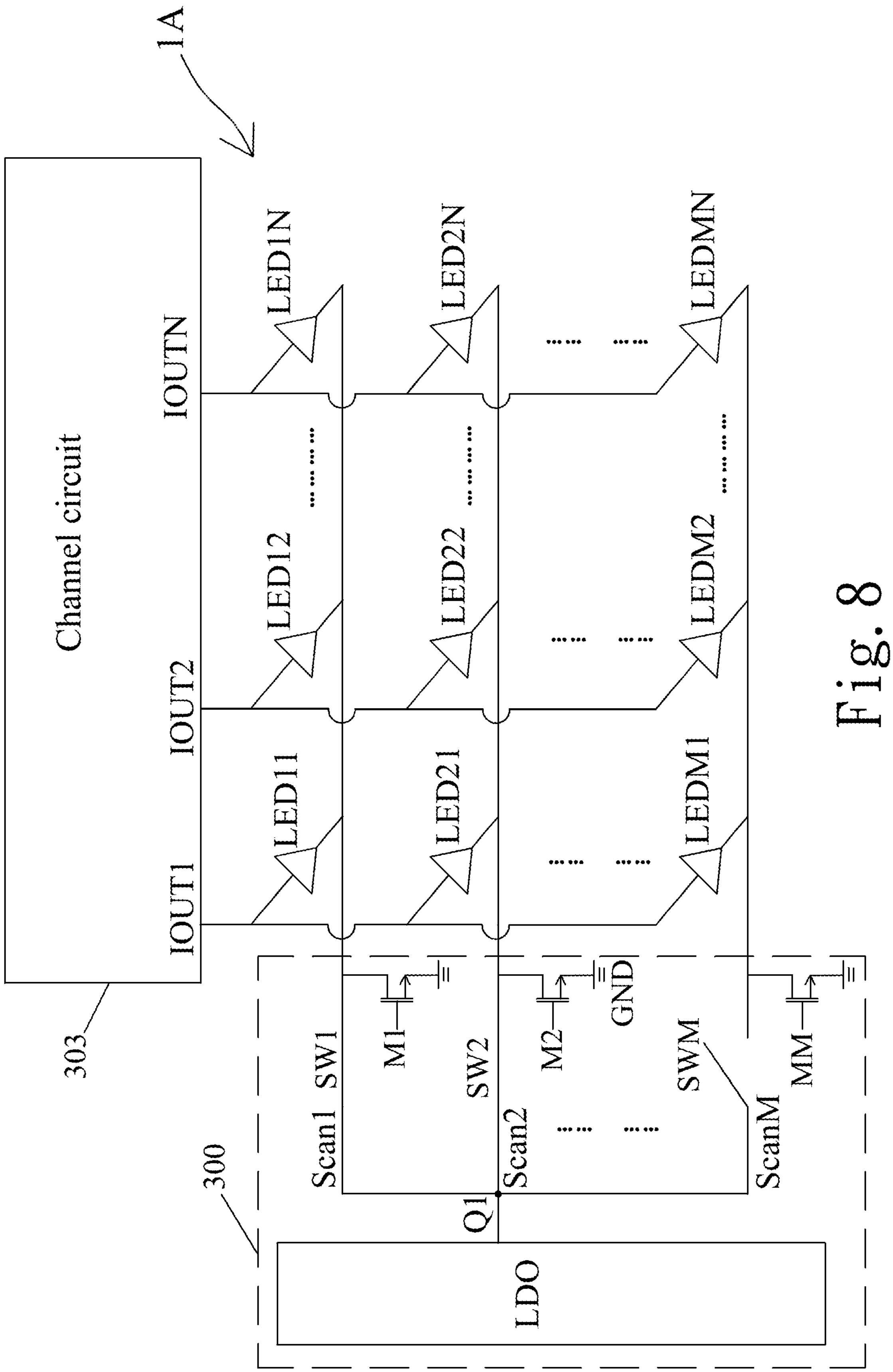
FIG. 8 schematically shows a diagram illustrating the operating state according to FIG. 3 when the final switching component SWM is open, and the rest switching components SW1, SW2 . . . SW(M-1) are closed.

By applying the same methodologies, FIG. 8 schematically shows a diagram illustrating the operating state when the final scan line ScanM is activated, while the rest scan lines Scan1, Scan2 . . . Scan (M-1) are disabled. At this time, the final switching component SWM connected with the final scan line ScanM will be open, while the plurality of switching components except the final switching component SWM are closed so as to pull up the voltage level of the plurality of the scan lines except the final scan line ScanM. In this case, the final switching component SWM is open, and the rest switching components SW1, SW2 . . . SW(M-1) are closed, so as to pull up the voltage level of the scan lines Scan1, Scan2 . . . Scan (M-1), and effectively avoid the upside ghosting imaging on the light-emitting-diode (LED) display panel 1A.

As a result, to sum up, it is believed that, according to the first embodiment of the present invention, an LDO circuit (low-dropout regulator circuit) is provided and configured to be disposed in the scan circuit, so that the objective for de-ghosting can be achieved in a low circuit area consumption criterion. At the same time, the present invention may also achieve in both reducing the power consumption of the light-emitting-diode display panel and solving the traditional deficiency of signal coupling, since the light-emitting-diodes in the panel that should not be lighted up are suppressed. Thereby, it is ensured that the disclosed present invention is able to provide superior inventive effects while compared with the prior arts in the related technical backgrounds.

Moreover, in the following sections, the Applicants of the present invention further disclose a second embodiment for implementing the proposed scan circuit applicable to driving a plurality of light-emitting-diodes (LED) of a display panel. Please refer to FIG. 9, which shows a diagram schematically illustrating a scan circuit 900, which is applicable to driving a light-emitting-diode display panel 1B in accordance with a second embodiment of the present invention. As referring to the second embodiment in FIG. 9, the scan circuit 900 is provided in order to drive a light-emitting-diode display panel 1B, and the light-emitting-diode display panel 1B is composed of a plurality of light-emitting-diodes LED11, LED12, . . . LED1N, LED21, LED22, . . . LED2N, LEDM1, LEDM2, . . . LEDMN disposed therein for emitting lights and functioning as illuminating, where M is a positive integer and N is a positive integer.

Similar to what we have described earlier in the first embodiment, a channel circuit 903 is configured and providing a plurality of channel lines IOUT1, IOUT2, . . . IOUTN. Each of the scan lines Scan1, Scan2, . . . ScanM is electrically connected with the plurality of channel lines IOUT1, IOUT2, . . . IOUTN, and each of the plurality of channel lines IOUT1, IOUT2, . . . IOUTN is disposed in a column perpendicular to the scan lines Scan1, Scan2, . . . ScanM. By such configurations, an anode of a light-emitting-diode can be coupled with one channel line while the cathode of the light-emitting-diode is coupled with one scan line.

Figure 9:
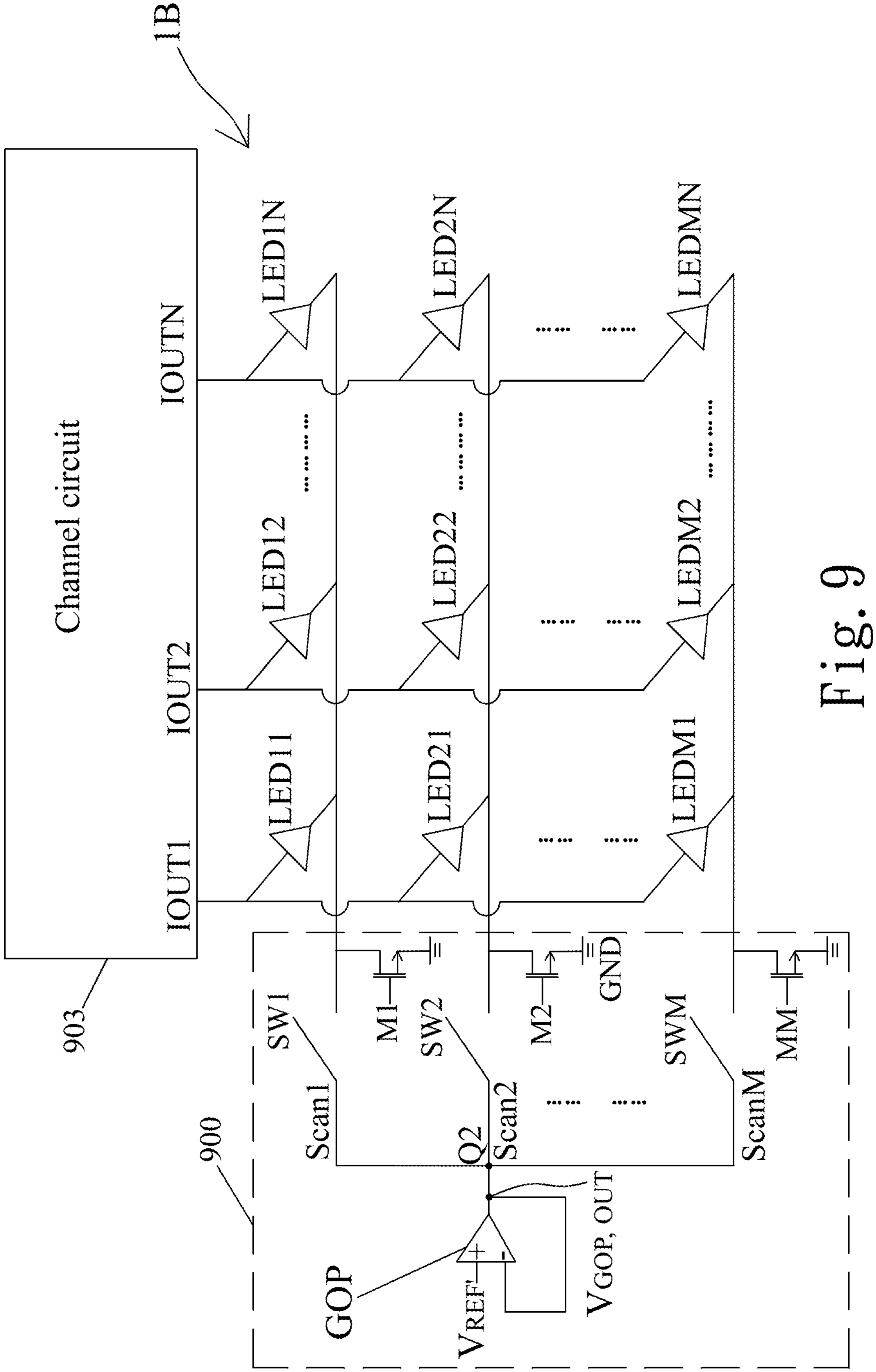
FIG. 9 shows a diagram schematically illustrating a scan circuit applicable to driving a plurality of light-emitting-diodes (LED) of a display panel in accordance with a second embodiment of the present invention.

As can be seen in the second embodiment of the present invention in FIG. 9, the disclosed scan circuit 900 is proposed so as to comprise a plurality of switching components SW1, SW2 . . . SWM, a plurality of power transistors M1, M2 . . . MM, as well as a global operational amplifier GOP. The global operational amplifier GOP is being electrically connected to the plurality of switching components SW1, SW2 . . . SWM such that a common joint Q2 is formed between the global operational amplifier GOP and the plurality of switching components SW1, SW2 . . . SWM, and the global operational amplifier GOP is operable to selectively pull up a voltage level of at least one of the scan lines Scan1, Scan2, . . . ScanM so as to avoid ghosting imaging occurring on the light-emitting-diode display panel 1B.

According to the technical characteristics of the second embodiment of the present invention, the global operational amplifier GOP is implemented as a negative feedback amplifier having its negative terminal (−) and output terminal commonly connected. A positive terminal of the global operational amplifier GOP is adapted to receive a reference voltage $V_{REF}$. An output terminal of the global operational amplifier GOP is electrically connected to the common joint Q2 of the plurality of switching components SW1, SW2 . . . SWM.

Figure 10:
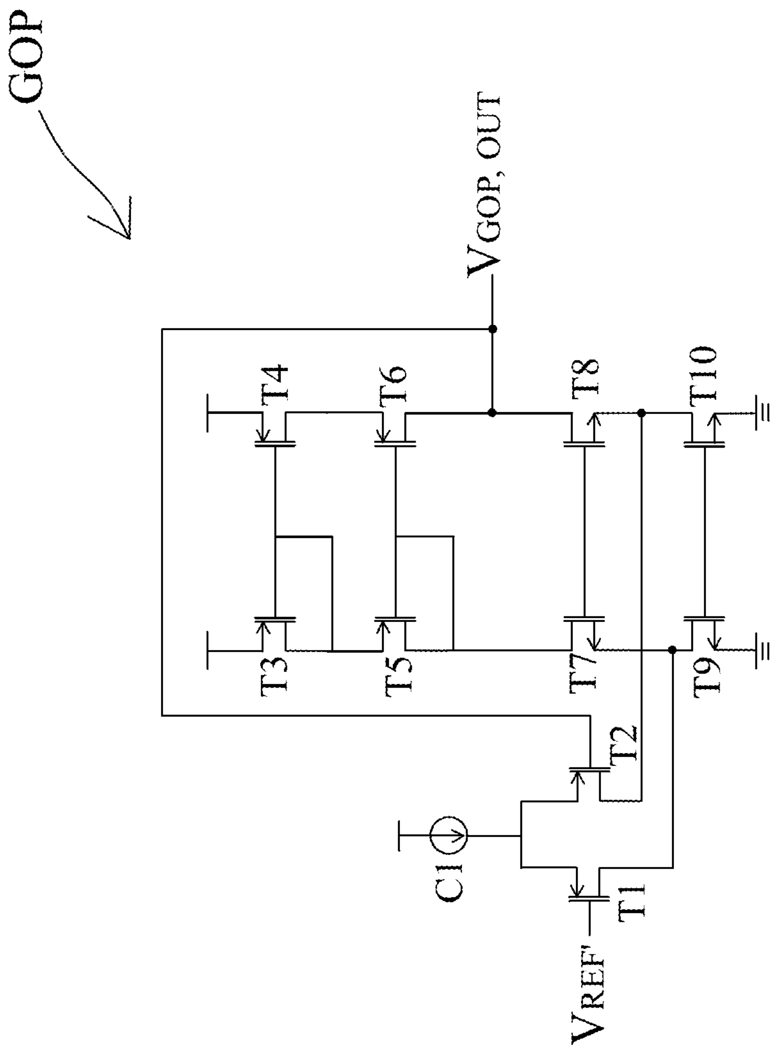
FIG. 10 schematically shows the circuit implementation of the proposed global operational amplifier GOP in accordance with the second embodiment of the present invention in FIG. 9.

Please refer to FIG. 10 for a detailed circuit diagram, in which FIG. 10 schematically shows the circuit implementation of the proposed global operational amplifier GOP in accordance with the second embodiment of the present invention in FIG. 9. As can be seen, the disclosed global operational amplifier GOP is proposed, comprising a plurality of transistors T1, T2, T3, T4, T5, T6, T7, T8, T9, T10 as well as a current source C1. Among these transistors T1, T2, T3, T4, T5, T6, T7, T8, T9, T10, an array of current mirrors can be formed, constituting the global operational amplifier GOP disclosed in the present invention. A gate terminal of the transistor T1 is provided to receive the above-mentioned reference voltage $V_{REF}$. A drain terminal of the transistor T8 and a drain terminal of the transistor T6 are commonly connected to output an output voltage $V_{GOP, OUT}$ and the output voltage $V_{GOP, OUT}$ is then coupled in common to a gate terminal of the transistor T2, which is also the negative terminal (−) of the global operational amplifier GOP in FIG. 9.

By such configurations according to the second embodiment of the present invention, the output voltage $V_{GOP, OUT}$ of the global operational amplifier GOP is a positive voltage, and the positive voltage $V_{GOP, OUT}$ output by the global operational amplifier GOP can be made, for example, in a range between 1V and 2V, under the condition that the reference voltage $V_{REF}$ is given also in a range between 1V and 2V. As a result, by generating and outputting the positive voltage $V_{GOP, OUT}$, the global operational amplifier GOP is able to output the positive voltage $V_{GOP, OUT}$ to the common joint Q2 of the plurality of switching components SW1, SW2 . . . SWM and selectively pull up and raise a voltage level of at least one of the scan lines Scan1, Scan2, . . . ScanM in order to avoid the unexpected ghosting imaging generated on the light-emitting-diode display panel 1B.

The detailed operations are similar to what the Applicants have disclosed in the previous embodiment as shown in FIG. 6 to FIG. 8. Therefore, the similar technical descriptions are to be omitted thereto. It should be relevant to people who have ordinary knowledge and are skilled in the arts for practical implementations. To sum above all, it should be obvious that the global operational amplifier GOP is provided to output the positive voltage $V_{GOP,\ OUT}$ such that when a certain row of the scan lines is activated, the switching component connected with the certain scan line should be open, and the rest switching components except the open switching component should be closed. As such, the voltage level of the rest scan lines except the activated scan line can be raised and pulled up to a high voltage level, thereby eliminating the unexpected current paths generated in the light-emitting-diodes that are not supposed to be lighted up. As a result, the conventional ghosting imaging on the light-emitting-diode display panel can be effectively suppressed and avoided. In the meantime, redundant power waste of the light-emitting-diode display panel is greatly reduced.

According to the present invention, the foregoing disclosed scan circuits are proposed to be applied to a light-emitting-diode display panel, which includes a plurality of M scan lines and a plurality of N channel lines, such that a plurality of (M*N) light-emitting-diodes where M is a positive integer and N is a positive integer, are disposed in a matrix from of the LED panel, for example. And yet the present invention is certainly not limited to the above-disclosed configurations. Alternative preferable components may also be compatible as well.

As a result, based on at least one embodiment provided above, it is believed that the proposed scan circuit of the present invention is characterized by integrating either a low-dropout regulator circuit or a global operational amplifier inside the scan circuit configuration. Either the low-dropout regulator circuit or the global operational amplifier is disposed as being commonly connected with the scan lines of the light-emitting-diode display panel, such that the voltage level of the scan lines which are not activated can be pulled up to a high voltage level, stopping the current paths to be formed from the anode to the cathode of the light-emitting-diodes. By employing the proposed scheme, the present invention is believed as beneficial to avoiding the conventional ghosting issues in the prior arts and at the same time solving the traditional signal coupling deficiency. Moreover, this invention can also be adopted for achieving the objective of reducing redundant power waste of the light-emitting-diode display panel. On account of all, when compared to the prior arts, it should be obvious that the present invention apparently shows much more effective performances than before. In addition, it is believed that the present invention is instinct, effective and highly competitive for IC technology and industries in the panel device market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A scan circuit applicable to driving a plurality of light-emitting-diodes (LED) of a display panel, comprising:

a plurality of switching components, wherein each of the plurality of switching components is electrically connected with a scan line of the display panel for determining if the plurality of LEDs connected to the scan line are conductive, a plurality of power transistors, disposed corresponding to a plurality of the scan lines of the display panel, wherein each of the plurality of power transistors is electrically connected to each of the plurality of the scan lines; and a low-dropout regulator circuit, being electrically connected to the plurality of switching components such that a common joint is formed between the low-dropout regulator circuit and the plurality of switching components, and the low-dropout regulator circuit selectively pulls up a voltage level of at least one of the scan lines so as to avoid ghosting imaging on the display panel.

2. The scan circuit applicable to driving the plurality of light-emitting-diodes (LED) of the display panel according to claim 1, wherein the plurality of the scan lines is sequentially activated as each of the plurality of power transistors connected thereto the corresponding scan line, is sequentially turned on.

3. The scan circuit applicable to driving the plurality of light-emitting-diodes (LED) of the display panel according to claim 1, wherein when a first row of the plurality of the scan lines is activated, a first switching component connected with the first row of the plurality of the scan lines is open, and the plurality of switching components except the first switching component are closed so as to pull up the voltage level of the plurality of the scan lines except the first row of the scan lines.

4. The scan circuit applicable to driving the plurality of light-emitting-diodes (LED) of the display panel according to claim 3, wherein after the first row of the plurality of the scan lines is activated, the second row of the plurality of the scan lines is activated following the first row, and the first row is disabled, a second switching component connected with the second row of the plurality of the scan lines is open, and the plurality of switching components except the second switching component are closed so as to pull up the voltage level of the plurality of the scan lines except the second row of the scan lines.

5. The scan circuit applicable to driving the plurality of light-emitting-diodes (LED) of the display panel according to claim 1, wherein each of the plurality of the scan lines is further coupled with a plurality of channel lines, and each of the plurality of channel lines is disposed in a column perpendicular to the scan lines.

6. The scan circuit applicable to driving the plurality of light-emitting-diodes (LED) of the display panel according to claim 5, wherein the plurality of light-emitting-diodes are configured in the display panel, and each of the plurality of light-emitting-diodes includes an anode and a cathode, where the anode is coupled with one of the plurality of channel lines and the cathode is coupled with one of the plurality of scan lines.

7. The scan circuit applicable to driving the plurality of light-emitting-diodes (LED) of the display panel according to claim 1, wherein the low-dropout regulator circuit comprises an operational amplifier, a power switch, an enable switch, a plurality of resistors connected in series and a low-dropout capacitance, a positive terminal of the operational amplifier is adapted to receive a reference voltage, a negative terminal of the operational amplifier is selectively coupled with a joint node of the plurality of resistors connected in series, and an output terminal of the operational amplifier is connected with a gate terminal of the power switch.

8. The scan circuit applicable to driving the plurality of light-emitting-diodes (LED) of the display panel according to claim 7, wherein a drain terminal of the power switch is coupled with a power supplied voltage through the enable switch and a source terminal of the power switch is electrically connected with the plurality of resistors which are connected in series, and outputting a positive voltage to the common joint where the low-dropout regulator circuit and the plurality of switching components are commonly connected.

9. The scan circuit applicable to driving the plurality of light-emitting-diodes (LED) of the display panel according to claim 8, wherein the reference voltage is 0.5V, and the positive voltage output by the low-dropout regulator circuit is in a range between 1V and 2V.

10. The scan circuit applicable to driving the plurality of light-emitting-diodes (LED) of the display panel according to claim 8, wherein the source terminal of the power switch is further coupled to a ground terminal through the low-dropout capacitance.

11. A scan circuit applicable to driving a plurality of light-emitting-diodes (LED) of a display panel, comprising:

a plurality of switching components, wherein each of the plurality of switching components is electrically connected with a scan line of the display panel for determining if the plurality of LEDs connected to the scan line are conductive, a plurality of power transistors, disposed corresponding to a plurality of the scan lines of the display panel, wherein each of the plurality of power transistors is electrically connected to each of the plurality of the scan lines; and a global operational amplifier, being electrically connected to the plurality of switching components such that a common joint is formed between the global operational amplifier and the plurality of switching components, and the global operational amplifier selectively pulls up a voltage level of at least one of the scan lines so as to avoid ghosting imaging on the display panel.

12. The scan circuit applicable to driving the plurality of light-emitting-diodes (LED) of the display panel according to claim 11, wherein the plurality of the scan lines is sequentially activated as each of the plurality of power transistors connected thereto the corresponding scan line, is sequentially turned on.

13. The scan circuit applicable to driving the plurality of light-emitting-diodes (LED) of the display panel according to claim 11, wherein when a first row of the plurality of the scan lines is activated, a first switching component connected with the first row of the plurality of the scan lines is open, and the plurality of switching components except the first switching component are closed so as to pull up the voltage level of the plurality of the scan lines except the first row of the scan lines.

14. The scan circuit applicable to driving the plurality of light-emitting-diodes (LED) of the display panel according to claim 13, wherein after the first row of the plurality of the scan lines is activated, the second row of the plurality of the scan lines is activated following the first row, and the first row is disabled, a second switching component connected with the second row of the plurality of the scan lines is open, and the plurality of switching components except the second switching component are closed so as to pull up the voltage level of the plurality of the scan lines except the second row of the scan lines.

15. The scan circuit applicable to driving the plurality of light-emitting-diodes (LED) of the display panel according to claim 11, wherein each of the plurality of the scan lines is further coupled with a plurality of channel lines, and each of the plurality of channel lines is disposed in a column perpendicular to the scan lines.

16. The scan circuit applicable to driving the plurality of light-emitting-diodes (LED) of the display panel according to claim 15, wherein the plurality of light-emitting-diodes are configured in the display panel, and each of the plurality of light-emitting-diodes includes an anode and a cathode, where the anode is coupled with one of the plurality of channel lines and the cathode is coupled with one of the plurality of scan lines.

17. The scan circuit applicable to driving the plurality of light-emitting-diodes (LED) of the display panel according to claim 11, wherein the global operational amplifier includes a positive terminal, a negative terminal and an output terminal, the positive terminal of the global operational amplifier is adapted to receive a reference voltage, the output terminal of the global operational amplifier is electrically connected to the common joint of the plurality of switching components, and the negative terminal and the output terminal of the operational amplifier are commonly connected.

18. The scan circuit applicable to driving the plurality of light-emitting-diodes (LED) of the display panel according to claim 17, wherein the reference voltage is in a range between 1V and 2V.

19. The scan circuit applicable to driving the plurality of light-emitting-diodes (LED) of the display panel according to claim 17, wherein a positive voltage generated at the output terminal of the global operational amplifier is in a range between 1V and 2V.

20. The scan circuit applicable to driving the plurality of light-emitting-diodes (LED) of the display panel according to claim 11, wherein the global operational amplifier is a negative feedback amplifier.

* * * * *